United States Patent [19]

Murakami

[11] Patent Number: 5,896,469
[45] Date of Patent: *Apr. 20, 1999

[54] IMAGE SHARPNESS PROCESSING METHOD AND APPARATUS

[75] Inventor: Shigeo Murakami, Kyoto, Japan

[73] Assignee: Dainippon Screen Mfg. Co., Ltd., Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/862,294

[22] Filed: May 22, 1997

[30] Foreign Application Priority Data

Jun. 28, 1996 [JP] Japan ..................... 8-169014

[51] Int. Cl.$^6$ .................. G06K 9/40; G06K 9/00
[52] U.S. Cl. ............... 382/266; 382/162; 382/254
[58] Field of Search .................. 382/266, 254, 382/263, 167, 162; 358/518, 517, 531, 532; 348/606, 625

[56] References Cited

U.S. PATENT DOCUMENTS 4,972,256  11/1990  Hirosawa et al. ............ 358/532
5,682,443  10/1997  Gouch et al. ............... 382/254

Primary Examiner—Leo H. Boudreau
Assistant Examiner—Dmitry A. Novik
Attorney, Agent, or Firm—Nikaido, Marmelstein, Murray & Oram LLP

[57] ABSTRACT

A gray edge component and RGB color components of each pixel in an original image are generated. Saturation of each pixel in the original image is evaluated, and a mixing ratio is determined according to the saturation. Mixed edge components are generated for each pixel by mixing the gray edge component and the respective RGB edge components in the mixing ratio determined. The mixed RGB edge components are added to the RGB components of each pixel in the original image, respectively, to output a sharpened image. Apart from the mixing ratio determined from saturation of each pixel, a common fixed mixing ratio may be designated by the operator for application to all pixels.

13 Claims, 7 Drawing Sheets (a) original image (b) R component (c) G component (d) B component (e) gray component (f) gray component unsharp signal (g) gray edge component (h) R component after sharpening (i) G component after sharpening (j) B component after sharpening (a) original image (b) R component (c) G component (d) B component (e) R component unsharp signal (f) G component unsharp signal (g) B component unsharp signal (h) R edge component (i) G edge component (j) B edge component (k) R component after sharpening (l) G component after sharpening (m) B componrnt after sharpening

IMAGE SHARPNESS PROCESSING METHOD AND APPARATUS

BACKGROUND OF THE INVENTION

1. Field of the Invention

This invention relates to methods and apparatus for controlling sharpness of images in a printing plate making process and the like. More particularly, the invention relates to a technique of controlling, with unsharp masks, sharpness of color images separated into red (R), green (G) and blue (B), or the like.

2. Description of the Related Art

As is well known, unsharp mask processing is very effective and widely practiced as means of controlling image sharpness to improve the visual impression of reproduced images. The principle of unsharp mask processing will be described hereunder, taking a digitized monochromatic image for example.

Unsharp mask processing is performed through the following steps (A)–(C):

(A) First, a so-called blurred image (unsharp mask) is prepared from an original image. The blurred image is obtained by repeating an operation, for the entire original image, to replace image data of a key pixel with averaged image data of neighboring pixels.

(B) A difference between the original image and blurred image is obtained for each pixel, and the difference is regarded as an edge component of the pixel.

(C) The edge component is added to the corresponding pixel. The degree of sharpness may be controlled by multiplying the edge component by an appropriate numerical value prior to adding the edge component.

A similar process is performed for a color image, but the following two methods are used in relation to formation of edge components:

[First Method]

It is assumed here that a color image is separated into RGB components which are digitized.

(A) A gray image is prepared by extracting gray components from an original image. This gray image is used to prepare a blurred image of gray components.

(B) A difference between the gray image and the blurred image of gray components is obtained for each pixel, and the difference is regarded as an edge component of the pixel.

(C) The edge component of each pixel is added equally to the RGB components of each pixel in the original image.

A sharpened color image results from the above steps (A)–(C).

[Second Method]

Similarly, it is assumed that a color image is separated into RGB components which are digitized.

(A) Blurred RGB images are prepared from the planes of RGB components in the original image, respectively.

(B) A difference between the plane of R component in the original image and the blurred image of R component is obtained for each pixel, and the difference is regarded as an R edge component of the pixel. G edge component and B edge component are determined likewise.

(C) The R edge component of each pixel is added to the R component of each pixel in the original image. Similarly, the G edge component is added to the G component, and the B edge component to the B component.

A sharpened color image results from the above steps (A)–(C).

Conventional sharpness processing apparatus employ the first method or the second method noted above, but either causes the following inconvenience:

In an apparatus employing the first method, pixels having high degrees of saturation in the original color image fade in color to become white or black (hereinafter referred to also as "white edges or black edges"), as a result of unsharp mask processing.

In an apparatus employing the second method, achromatic or nearly achromatic pixels in the original color image assume strong color (hereinafter referred to also as "colored edges"), as a result of unsharp mask processing.

The reasons why the colored edges and the white or black edges occur will be described hereunder.

[Reason for Appearance of White or Black Edges]

Reference is made to FIG. 1. Assume that a row of pixels on one scan line in an original image includes gray and red lying adjacent each other as shown in FIG. 1(a). The RGB components forming this portion of the original image are shown in FIG. 1(b), (c) and (d).

The following description is based on the assumption that unsharp mask processing in the first method is effected for this portion.

FIG. 1(e) shows a gray component (gray image) extracted from the original image shown in FIG. 1(a). A blurred image (unsharp signal) of this gray component is as shown in FIG. 1(f). A gray edge component as shown in FIG. 1(g) is obtained by subtracting the blurred image (FIG. 1(f)) of the gray component from the gray image (FIG. 1(e)). When this edge component is added equally to the RGB components (FIG. 1(b), (c) and (d)) of each pixel in the original image, sharpened RGB components as shown in FIG. 1(h), (i) and (j) are obtained.

As seen from FIG. 1(h), (i) and (j), gray pixels at the boundary between gray and red are darkened (with the levels of RGB components lowered equally) as a result of sharpness processing. This gives no visual incongruity. However, with the red pixels at the boundary, the gray edge component added to the RGB components raises the levels of the respective components. As a result, the red pixels at the boundary become white to form a white edge. This causes visual incongruity because of a white streak running through the originally red area. Even if a distinct white or black streak is invisible, the stronger unsharp mask processing tends to make the image the less bright. Particularly where the original image includes thin, bright-color lines, color information of the lines will be lost, thereby to lower image quality markedly.

[Reason for Appearance of Colored Edge]

Reference is made to FIG. 2. As in the foregoing description, it is assumed that unsharp mask processing in the second method is effected for an area where gray and red are present adjacent each other as shown in FIG. 2(a). FIG. 2 (b), (c) and (d) show RGB components corresponding to FIG. 2 (a).

FIG. 2(e), (f) and (g) show blurred images (unsharp signals) of the RGB components shown in FIG. 2(b), (c) and (d), respectively. RGB edge components as shown in FIG. 2(h), (i) and (j) are obtained by subtracting the blurred images shown in FIG. 2(e), (f) and (g) from the RGB components shown in FIG. 2(b), (c) and (d), respectively. When these edge components are added individually to the RGB components (FIG. 2(b), (c) and (d)) of each pixel in the original image, sharpened RGB components as shown in FIG. 2(k), (l) and (m) are obtained.

As seen from FIG. 2(k), (l) and (m), gray pixels at the boundary between gray and red become blue or green, with the R component decreased (see FIG. 2(k)) and the GB components increased (see FIG. 2(l) and (m)) as a result of sharpness processing. This forms a colored streak in the gray side of the boundary to give visual incongruity. With the red pixels at the boundary, the R component is added and the GB components decrease. Since the red area is only accentuated to be redder, no visual incongruity is caused.

SUMMARY OF THE INVENTION

This invention has been made having regard to the state of the art noted above, and its primary object is to provide an image sharpness processing method and apparatus for improving the visual impression of images by unsharp mask processing performed in a way to avoid colored edges and white or black edges appearing in sharpened outline areas. The above object is fulfilled, according to this invention, by an image sharpness processing method for controlling sharpness of a color-separated original image with unsharp masks, comprising:

- a first edge component generating step for preparing a gray image of the original image by extracting gray components from the original image, preparing a gray unsharp mask which is a blurred gray image from the gray image, and determining a difference between the gray image and the gray unsharp mask for each pixel, the difference being regarded as a gray edge component of each pixel;
- a second edge component generating step for preparing color unsharp masks which are blurred images from respective color components of the original image, and determining a difference between an image composed of components of each color and a corresponding one of the color unsharp masks for each pixel, the difference being regarded as a color edge component of each pixel;
- a mixing ratio acquiring step for acquiring a mixing ratio between the gray edge component obtained at the first edge component generating step and each color edge component obtained at the second edge component generating step;
- an edge component mixing step for performing an operation, for each pixel and for each color component, to mix, in the mixing ratio acquired, the gray edge component generated at the first edge component generating step and each color edge component generated at the second edge component generating step; and
- an adding step for performing an operation, for each pixel and for each color component, to add each mixed color edge component obtained at the edge component mixing step to a corresponding one of the color components of the original image.

The following two methods are feasible for acquiring a mixing ratio.

The first mixing ratio acquiring method evaluates saturation of each pixel in the original image successively and determines a mixing ratio of the edge components for each pixel based on the saturation, such that, for pixels having low saturation, the edge component generated at the first edge component generating step is mixed in a larger amount than each edge component generated at the second edge component generating step, and for pixels having high saturation, each edge component generated at the second edge component generating step is mixed in a larger amount than the edge component generated at the first edge component generating step or in the larger amount for the lower saturation.

The second mixing ratio acquiring method acquires a common fixed mixing ratio designated for all pixels.

The image sharpness processing method of this invention has the following functions when the first mixing ratio acquiring method is adopted therein.

The unsharp mask processing using the gray edge component generated at the first edge component generating step emphasizes the gray component of the image, and therefore no colored edge appears in gray portions of the image. However, where highly saturated pixels are present adjacent the gray portions, all color components of these pixels undergo change in the same direction, thereby lowering the saturation to become white or black. Thus, the sharpness processing enhancing the gray edge component generated at the first edge component generating step is suited to pixels having a relatively low level of saturation.

On the other hand, the unsharp mask processing using the color edge components generated at the second edge component generating step emphasizes differences among the color components of each pixel. Highly saturated pixels will not become white or black to lose vividness of the image. However, where gray (i.e. pixels of low saturation) is present adjacent highly saturated portions, the gray pixels tends to assume strong color (to form a colored edge). Thus, the sharpness processing enhancing the color edge components generated at the second edge component generating step is suited to pixels having a relatively high level of saturation.

At the mixing ratio acquiring step, therefore, a mixing ratio is determined for each pixel based on saturation of each pixel as follows. Saturation of each pixel in the original image is evaluated successively and for pixels having low saturation, a mixing ratio of the edge components is determined such that the edge component generated at the first edge component generating step is mixed in a larger amount than each edge component generated at the second edge component generating step For pixels having high saturation, a mixing ratio of the edge components is determined such that each edge component generated at the second edge component generating step is mixed in a larger amount than the edge component generated at the first edge component generating step or in the larger amount for the lower saturation.

At the edge component mixing step, an operation is performed for each pixel and for each color component to mix the gray edge component and each color edge component in the mixing ratio determined for each pixel. At the adding step, an operation is performed, for each pixel and for each color component, to add each mixed color edge component obtained as above to a corresponding one of the color components of the original image. In this way, sharpness processing is effected to enhance the gray edge component or color edge components, depending on the saturation of each pixel. This achieves an improved visual impression of the image by avoiding formation of colored edges in gray portions and white or black edges in highly saturated portions.

The image sharpness processing method of this invention has the following functions when the second mixing ratio acquiring method is adopted therein.

With this method, the operator may designate a mixing ratio between the gray edge component and each color edge component based on an observation of the original image, to reflect his or her intended expression directly in the original image. For example, to enhance vividness of the image through sharpness processing, the operator may designate a mixing ratio of the edge components such that each color edge component generated at the second edge component generating step is mixed in a larger amount than the gray edge component generated at the first edge component generating step. To enhance the difference in brightness rather than vividness through sharpness processing, the operator may designate a mixing ratio such that the gray edge component generated at the first edge component generating step is mixed in a larger amount than each color edge component generated at the second edge component generating step.

In either one of the above methods, the adding step may be executed to control a degree of sharpness enhancement, by multiplying the mixed edge components by an appropriate coefficient when adding the mixed color edge component of each pixel to each color component of each pixel in the original image.

The gray image or gray unsharp mask, and color unsharp masks of the original image, may be obtained as set out below. These measures will simplify the processing and facilitate software implementation.

The gray image may be prepared by performing an operation, for all pixels constituting the original image, to calculate an average of color components constituting each pixel in the original image.

The gray unsharp mask may be prepared by successively treating individual pixels in the gray image as a key pixel, and replacing image data of the key pixel with an average of image data of neighboring pixels in the gray image.

Each color unsharp mask of the original image may be prepared by successively treating individual pixels in each color component image as a key pixel, and replacing image data of the key pixel with an average of image data of neighboring pixels in the each color component image.

Further, where the mixing ratio is determined based on saturation of each pixel, the saturation of each pixel in the original image and a mixing ratio for each pixel may be derived as follows, to simplify the processing and facilitate software implementation.

The saturation of each pixel may be determined by totaling absolute values of differences among the color components constituting each pixel.

The mixing ratio may be derived for each pixel from $MR=S/S_0$, where MR is a mixing ratio of each edge component determined at the second edge component generating step, (1−MR) is a mixing ratio of the edge component determined at the first edge component generating step, S is the saturation of each pixel, and $S_0$ is a maximum saturation.

Alternatively, the mixing ratio may be derived for each pixel from $MR=(S/S_0)\times\alpha$, where $\alpha$ is a constant set in advance according to which of the gray edge component and RGB edge components should be weighted. For weighting the gray edge component, a numerical value below 1 is set as $\alpha$. For weighting the RGB edge components, a numerical value above 1 is set.

In another aspect of this invention, there is provided an image sharpness processing apparatus for controlling sharpness of a color-separated original image with unsharp masks, comprising:

a first edge component generating device for preparing a gray image of the original image by extracting gray components from the original image, preparing a gray unsharp mask which is a blurred gray image from the gray image, and determining a difference between the gray image and the gray unsharp mask for each pixel, the difference being regarded as a gray edge component of each pixel;

a second edge component generating device for preparing color unsharp masks which are blurred images from respective color components of the original image, and determining a difference between an image composed of components of each color and a corresponding one of the color unsharp masks for each pixel, the difference being regarded as a color edge component of each pixel;

a mixing ratio determining device for evaluating saturation of each pixel in the original image successively and determining a mixing ratio of the edge components for each pixel based on the saturation, such that, for pixels having low saturation, the edge component generated by the first edge component generating device is mixed in a larger amount than each edge component generated by the second edge component generating device, and for pixels having high saturation, each edge component generated by the second edge component generating device is mixed in a larger amount than the edge component generated by the first edge component generating device or in the larger amount for the lower saturation;

an edge component mixing device for performing an operation, for each pixel and for each color component, to mix, in the mixing ratio determined by the mixing ratio determining device, the gray edge component generated by the first edge component generating device and each color edge component generated by the second edge component generating device; and an adding device for performing an operation, for each pixel and for each color component, to add each mixed color edge component obtained by the edge component mixing device to a corresponding one of the color components of the original image.

The above apparatus is suited for executing the image sharpness processing method of this invention in which the first mixing ratio acquiring method is adopted.

In a further aspect of this invention, an image sharpness processing apparatus for controlling sharpness of a color-separated original image with unsharp masks, comprises:

a first edge component generating device for preparing a gray image of the original image by extracting gray components from the original image, preparing a gray unsharp mask which is a blurred gray image from the gray image, and determining a difference between the gray image and the gray unsharp mask for each pixel, the difference being regarded as a gray edge component of each pixel;

a second edge component generating device for preparing color unsharp masks which are blurred images from respective color components of the original image, and determining a difference between an image composed of components of each color and a corresponding one of the color unsharp masks for each pixel, the difference being regarded as a color edge component of each pixel;

a mixing ratio designating device for designating a common fixed mixing ratio between the edge component obtained by the first edge component generating device and each edge component obtained by the second edge component generating device;

an edge component mixing device for performing an operation, for each pixel and for each color component, to mix, in the mixing ratio designated by the mixing ratio designating device, the gray edge component generated by the first edge component generating device and each color edge component generated by the second edge component generating device; and an adding device for performing an operation, for each pixel and for each color component, to add each mixed color edge component obtained by the edge component mixing device to a corresponding one of the color components of the original image.

The above apparatus is suited for executing the image sharpness processing method of this invention in which the second mixing ratio acquiring method is adopted.

Both the mixing ratio determining device and the mixing ratio designating device may be provided for one apparatus. Then, the edge component obtained by the first edge component generating device and each edge component obtained by the second edge component generating device may be mixed in a mixing ratio determined by the mixing ratio determining device or in a mixing ratio designated by the mixing ratio designating device. This feature enables selection and execution of a sharpness processing optimal to each different original image.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Preferred embodiments of this invention will be described in detail hereinafter with reference to the drawings.

<First Embodiment>

Figure 1:
FIG. 1 is an explanatory view of a conventional example of unsharp mask processing.
Figure 1:
Figure 1:
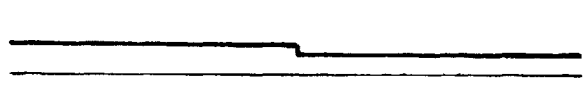
Figure 1:
Figure 1:
Figure 1:
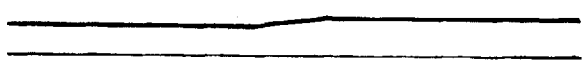
Figure 1:
Figure 1:
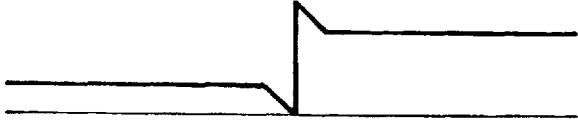
Figure 1:
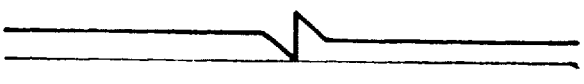
Figure 1:
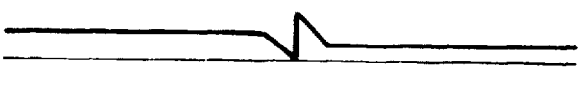
Figure 2:
FIG. 2 is an explanatory view of another conventional example of unsharp mask processing.
Figure 2:
Figure 2:
Figure 2:
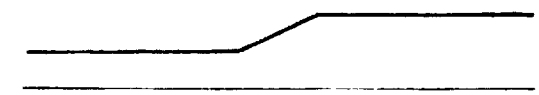
Figure 2:
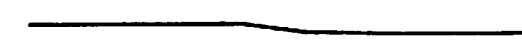
Figure 2:
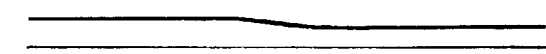
Figure 2:
Figure 2:
Figure 2:
Figure 2:
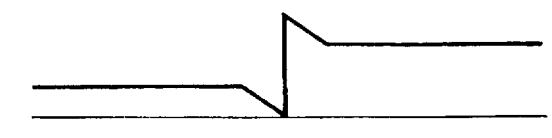
Figure 2:
Figure 2:
Figure 3:
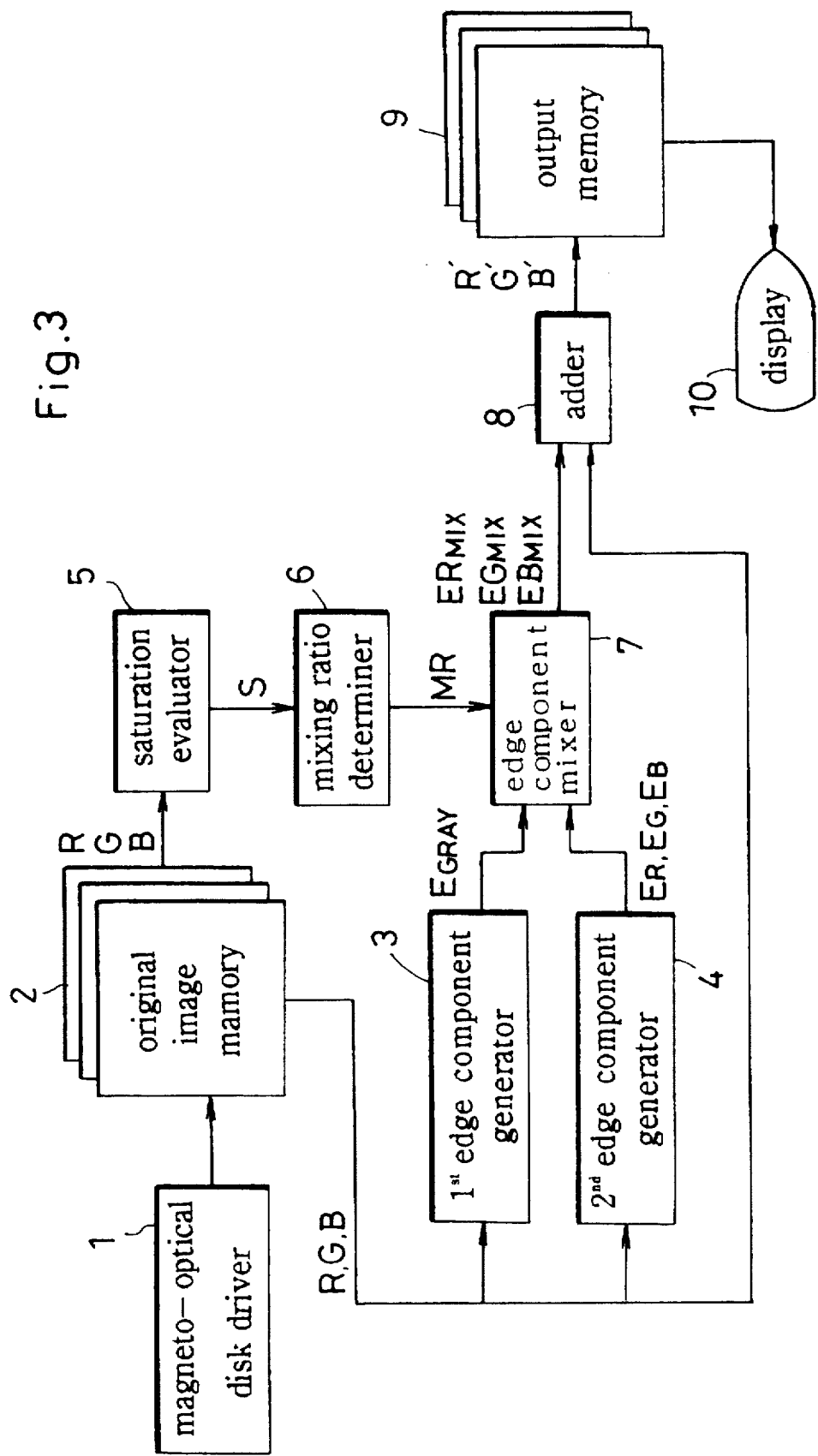
FIG. 3 is a block diagram showing an outline of an image sharpness processing apparatus in a first embodiment of this invention.

An apparatus in the first embodiment will be described with reference to FIG. 3.

In a plate-making process, for example, an original color image is scanned line by line with a color scanner to be separated into color components of red (R), green (G) and blue (B). Image data of these color components are recorded on a magneto-optical disk or the like. The original image data recorded on the magneto-optical disk are taken into the apparatus through a magneto-optical disk driver 1 shown in FIG. 3. Original image data may be taken into the apparatus in any other way, e.g. directly from the color scanner, or through a different recording medium such as magnetic tape. The original image data taken into the apparatus are stored in the form of separate RGB color components in an original image memory 2.

The apparatus includes a first edge component generator 3 and a second edge component generator 4. The first edge component generator 3 is used to generate a gray edge component from each pixel in the original image stored in the original image memory 2. The second edge component generator 4 is used to generate RGB color edge components of each pixel.

The first edge component generator 3 extracts gray components from the original image data, prepares a gray image of the original image, prepares an unsharp mask or blurred image of the gray components from this gray image, and determines a difference between the gray image and the unsharp mask of gray components for each pixel, which difference is regarded as the gray edge component of each pixel. It is not essential to extract the gray components strictly based on color measurement. This apparatus obtains a broadly gray component of each pixel in a simple way as expressed by the following equation (1):

$$\text{Gray}=(R+G+B)/3 \tag{1}$$

where Gray is a gray component, and R, G and B are image data of red (R), green (G) and blue (B) color components constituting one pixel in the original image and expressed, for example, in numerical values 0 to 255.

A gray image of the original image may be obtained by determining gray components "Gray" of all pixels in the original image.

Figure 4A:
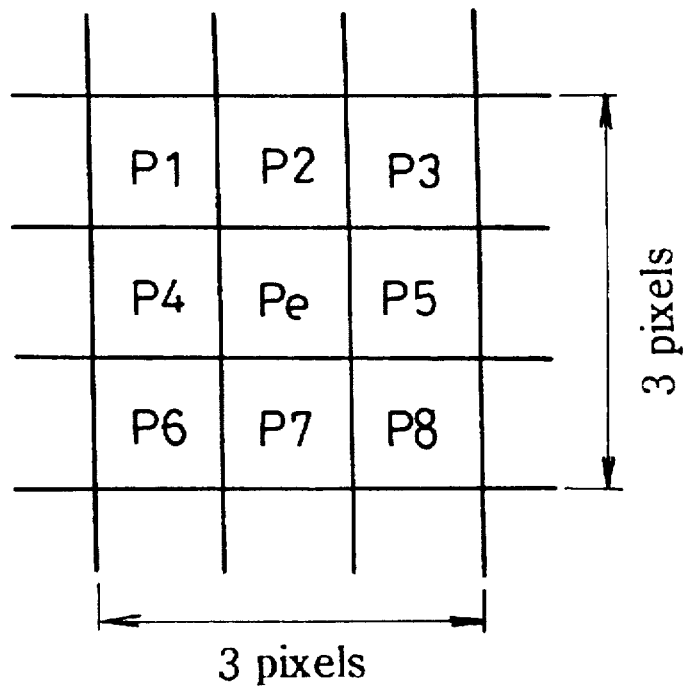
FIGS. 4A and 4B are explanatory views of unsharp mask preparation.
Figure 4B:
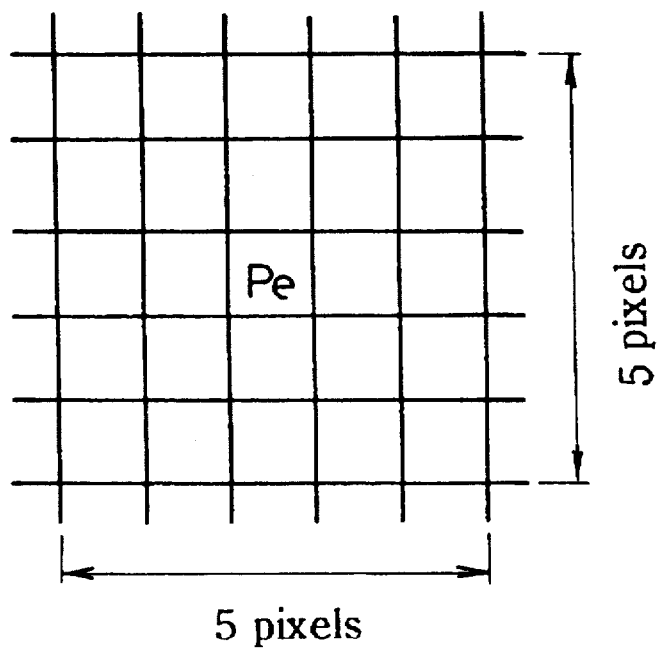

A blurred image (unsharp mask) of the gray components may be obtained, for example, by performing an operation, for all pixels in the gray image, to replace the image data of a key pixel Pe in the gray image with an average of the image data of itself and neighboring pixels as shown in FIG. 4A (e.g. nine pixels Pe and P1–P8 in an area of 3×3 pixels around the key pixel Pe). The area size does not necessarily have to be 3×3 pixels. As shown in FIG. 4B, an area size of 5×5 pixels may be adopted. A gray edge component is obtained by determining, for each pixel, a difference between the gray image and the unsharp mask of gray components.

The second edge component generator 4 prepares unsharp masks or blurred images of RGB color components from the RGB color components of the original image, respectively, and determines differences between the respective color components and the unsharp masks for each pixel, which differences are regarded as the RGB edge components of each pixel. An R edge component, for example, is obtained, as is the gray edge component, by performing an operation, for all pixels an image composed of R components (i.e. an R plane), to replace the image data of a key pixel with an average of the image data of itself and neighboring pixels, thereby to obtain an unsharp mask of R components, and then to determine, for each pixel, a difference between the R plane and the unsharp mask of R components. G and B edge components are obtained by performing similar operations for G and B components.

A saturation evaluator 5 evaluates a level of saturation of each pixel in the original image from the RGB image data of the original image stored in the original image memory 2. Saturation need not be detected strictly, either. In this apparatus, the saturation of each pixel is computed in a simple way by totaling absolute values among the RGB color components constituting a key pixel, i.e. summing absolute values of a difference between R and G, a difference between G and B and a difference between B and R, as expressed by the following equation (2):

$$S=\text{abs}(R-G)+\text{abs}(G-B)+\text{abs}(B-R) \tag{2}$$

where S is saturation, and abs is an absolute value.

In this apparatus, where the image data are digitized to 8-bit precision, RGB is expressed in numerical values 0 to 255, and hence saturation S is expressed in numerical values 0 to 510.

A mixing ratio determiner 6 determines mixing ratios between gray edge component and RGB edge components for all pixels in the original image based on the evaluation of the saturation of each pixel by the saturation evaluator 5. When the saturation of a key pixel is low, the gray edge component generated by the first edge component generator 3 is mixed in a larger amount than each of the RGB edge components generated by the second edge component generator 4. When saturation is high, each of the RGB edge components is mixed in a larger amount than the gray edge component or in the larger amount for the lower saturation. In this apparatus, mixing ratio MR between the edge components is determined by the following equation (3):

$$MR = S/S_0 \tag{3}$$

where S is a level of saturation evaluated by the saturation evaluator 5, and $S_0$ is a maximum saturation (=510).

It will be appreciated from equation (3) that mixing ratios determined by the mixing ratio determiner 6 are expressed in numerical values 0 to 1. As will be clear from the description made hereinafter of an edge component mixer 7, (1−MR) is a mixing ratio of the gray edge component, and MR a mixing ratio of the RGB edge components. The determination of mixing ratios is not limited to equation (3), but the following equation (4) may be used instead:

$$MR = (S/S_0) \times \alpha \tag{4}$$

Coefficient a is a constant set in advance according to which of the gray edge component and RGB edge components should be weighted. For weighting the gray edge component, a numerical value below 1 is set as α. For weighting the RGB edge components, a numerical value above 1 is set.

The above saturation evaluator 5 and mixing ratio determiner 6 correspond to the mixing ratio determining device of this invention.

The edge component mixer 7 obtains mixed edge components for the RGB color components of all pixels in the original image by performing an operation, for each pixel and for each color component, to mix the gray edge component generated by the first edge component generator 3 and each of the RGB edge components generated by the second edge component generator 4, according to the mixing ratio determined by the mixing ratio determiner 6. In this apparatus, mixed edge components are obtained for the RGB components of each pixel from the following equations (5)–(7):

$$ER_{MIX} = E_{GRAY} \times (1-MR) + E_R \times MR \tag{5}$$

$$EG_{MIX} = E_{GRAY} \times (1-MR) + E_G \times MR \tag{6}$$

$$EB_{MIX} = E_{GRAY} \times (1-MR) + E_B \times MR \tag{7}$$

where $ER_{MIX}$, $EG_{MIX}$ and $EB_{MIX}$ are the respective mixed RGB edge components, and $E_{GRAY}$ is the gray edge component.

An adder 8 obtains sharpened image data by performing an operation, for each pixel, to add the mixed RGB edge components obtained by the edge component mixer 7 to the RGB color components of the original image stored in the original image memory 2. Sharpened color components R', G' and B' of each pixel are expressed by the following equations (8), (9) and (10):

$$R' = R + ER_{MIX} \tag{8}$$

$$G' = G + EG_{MIX} \tag{9}$$

$$B' = B + EB_{MIX} \tag{10}$$

At this time, the degree of sharpness enhancement may be controlled by multiplying each mixed edge component by an appropriate numerical value (e.g. 0.2 to 5).

An output memory 9 stores the sharpened color components R', G' and B' of each pixel. These color components R', G' and B' may be outputted to a display 10 to show a sharpened image thereon.

The sharpened image data may be outputted in any desired form; they may be recorded on a recording medium such as a magneto-optical disk or magnetic tape, or may be outputted directly to an image recording scanner.

In this embodiment, the first edge component generator 3, second edge component generator 4, saturation evaluator 5, mixing ratio determiner 6, edge component mixer 7 and adder 8 are provided in the form of computer software.

An operation of the apparatus having the above construction will be described next.

When image data of digitized RGB color components of an original image are stored in the original image memory 2, the saturation evaluator 5 successively reads the image data of the RGB color components of each pixel from the original image memory 2, and evaluates saturation S of each pixel. Saturation S of each pixel is given to the mixing ratio determiner 6 which then determines mixing ratio MR between the gray edge component and RGB edge components for each pixel.

Synchronously with the communication of the RGB image data to the saturation evaluator 5, the RGB image data of each pixel are transmitted also to the first edge component generator 3 and second edge component generator 4. The first edge component generator 3 generates gray edge component $E_{GRAY}$ of each pixel. The second edge component generator 4 generates RGB edge components $E_R$, $E_G$ and $E_B$ of each pixel. These edge components $E_{GRAY}$, $E_R$, $E_G$ and $E_B$ are applied to the edge component mixer 7.

The edge component mixer 7 generates mixed RGB edge components for each pixel by mixing the gray edge component $E_{GRAY}$ with the RGB edge components $E_R$, $E_G$ and $E_B$ in the mixing ratio MR received from the mixing ratio determiner 6.

The adder 8 generates sharpened color components R', G' and B' by adding the RGB edge components $E_R$, $E_G$ and $E_B$ received from the edge component mixer 7 to the RGB image data of the original image successively received from the original image memory 2. The color components R', G' and B' are stored in the output memory 9, and shown on the display 10 as necessary.

Figure 5:
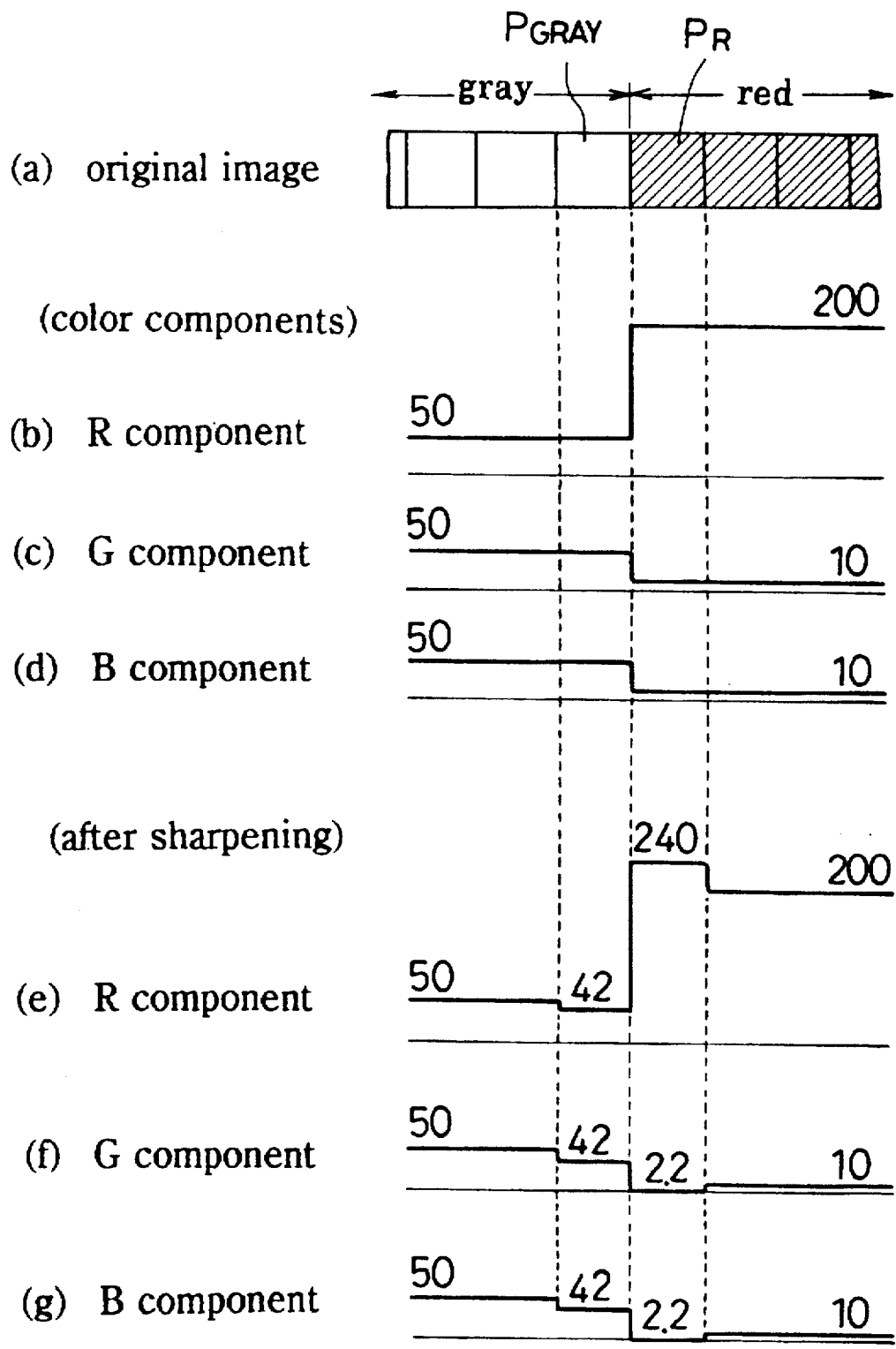
FIG. 5 is an explanatory view of unsharp mask processing in the first embodiment.

A specific example of unsharp mask processing by this apparatus will be described hereinafter with reference to FIG. 5.

Unsharp mask processing is carried out pixel by pixel along each scan line in the original image. It is assumed here that unsharp mask processing is effected for a portion including gray and red lying adjacent each other as shown in FIG. 5(a). Gray pixels $P_{GRAY}$ are processed first, and then red pixels $P_R$ are processed. As shown in FIG. 5(b), (c) and (d), the gray pixels $P_{GRAY}$ have color components R=50, G=50 and B=50, while the red pixels $P_R$ have color components R=200, G=10 and B=10.

First, the saturation evaluator 5 evaluates saturation S of the gray pixels $P_{GRAY}$ using equation (2), as follows:

$$S = abs(50-50) + abs(50-50) + abs(50-50)$$

Thus, S=0. As a result, mixing ratio MR expressed by equation (3) becomes zero. Therefore, the mixed edge components $ER_{MIX}$, $EG_{MIX}$ and $EB_{MIX}$ derived from equations (5)–(7) by the edge component mixer 7 are only gray edge component $E_{GRAY}$ ($ER_{MIX}=EG_{MIX}=EB_{MIX}=E_{GRAY}$).

This gray edge component $E_{GRAY}$ is obtained by the first edge component generator 3 as follows. When a gray image is derived from equation (1), the gray component in gray regions is Gray=(50+50+50)/3=50, and the gray component in red regions is Gray=(200+10+10)/3≠73. Next, unsharp signal U of the gray component of key pixel $P_{GRAY}$ is obtained based on the gray components of key pixel $P_{GRAY}$ and 3×3 neighboring pixels, as U=(50×6+73×3)/9≠58. The unsharp signal U of the gray component of key pixel $P_{GRAY}$ is subtracted from the gray component Gray (=50) of key pixel $P_{GRAY}$ to obtain gray edge component $E_{GRAY}$ of key pixel $P_{GRAY}$. $E_{GRAY}$=50–58=–8.

The gray edge component $E_{GRAY}$ of the key pixel is given to the adder 8 as mixed edge components $ER_{MIX}$, $EG_{MIX}$ and $EB_{MIX}$ which are added to the RGB components of key pixel $P_{GRAY}$. The color components R', G' and B' of sharpened key pixel $P_{GRAY}$ are expressed as follows (see FIG. 5(e), (f) and (g)):

$$R'=50+(-8)=42$$

$$G'=50+(-8)=42$$

$$B'=50+(-8)=42$$

It will be appreciated from the value of color components R', G' and B' of sharpened key pixel $P_{GRAY}$ that the RGB components of gray key pixel $P_{GRAY}$ are equally decreased. That is, gray pixels at the boundary between gray and red are stressed in dark gray in this example, without upsetting the balance of the RGB components, i.e. without forming a colored edge, in the gray portion.

After the gray pixels $P_{GRAY}$, red pixels $P_R$ (R=200, G=10 and B=10) are subjected to unsharp mask processing. Key pixel $P_R$ has the following saturation S:

$$S=abs(200-10)+abs(10-10)+abs(10-200)=190+0+190=380$$

As a result, mixing ratio MR=380/510≠0.75. Therefore, the edge component mixer 7 generates the following mixed edge components:

$$ER_{MIX}=E_{GRAY}\times(1-0.75)+E_R\times0.75$$

$$EG_{MIX}=E_{GRAY}\times(1-0.75)+E_G\times0.75$$

$$EB_{MIX}=E_{GRAY}\times(1-0.75)+E_B\times0.75$$

The gray edge component $E_{GRAY}$ of red key pixel $P_R$ is generated by the first edge component generator 3. Specifically, the gray component of key pixel $P_R$ is approximately 73, and the unsharp signal thereof approximately 65. Therefore, the gray edge component $E_{GRAY}$ is 8.

On the other hand, RGB edge components $E_R$, $E_G$ and $E_B$ of red key pixel $P_R$ are generated by the second edge component generator 4. Specifically, RGB unsharp signals $R_u$, $G_u$ and $B_u$ of key pixel $P_R$ are derived as follows:

$$R_u=(50\times3+200\times6)/9=150$$

$$G_u=(50\times3+10\times6)/9\neq150$$

$$B_u=(50\times3+10\times6)/9\neq150$$

Therefore, edge components $E_R$, $E_G$ and $E_B$ are as follows:

$$E_R=200-150=50$$

$$E_G=10-23=-13$$

$$E_B=10-23=-13$$

The edge components generated by the first edge component generator 3 and second edge component generator 4 are mixed in the mixing ratio MR (=0.75) based on the saturation of key pixel $P_R$. The following mixed edge components $ER_{MIX}$, $EG_{MIX}$ and $EB_{MIX}$ result therefrom:

$$ER_{MIX}=8\times(1-0.75)+50\times0.75\neq40$$

$$EG_{MIX}=8\times(1-0.75)-13\times0.75\neq-7.8$$

$$EB_{MIX}=8\times(1-0.75)-13\times0.75\neq-7.8$$

These mixed edge components $ER_{MIX}$, $EG_{MIX}$ and $EB_{MIX}$ are given to the adder 8 and added to the RGB components of key pixel $P_R$. The color components R', G' and B' of sharpened key pixel $P_{GRAY}$ are expressed as follows (see FIG. 5(e), (f) and (g)):

$$R'=200+40=240$$

$$G'=10+(-7.8)=2.2$$

$$B'=10+(-7.8)=2.2$$

It will be appreciated from the values of color components R', G' and B' of sharpened key pixel $P_R$ that the red (R component) of key pixel $P_R$ having high saturation from the start is stressed vivid. The G and B components are restrained. Thus, no white or black edge appears in red regions at the boundary.

<Second Embodiment>

Figure 6:
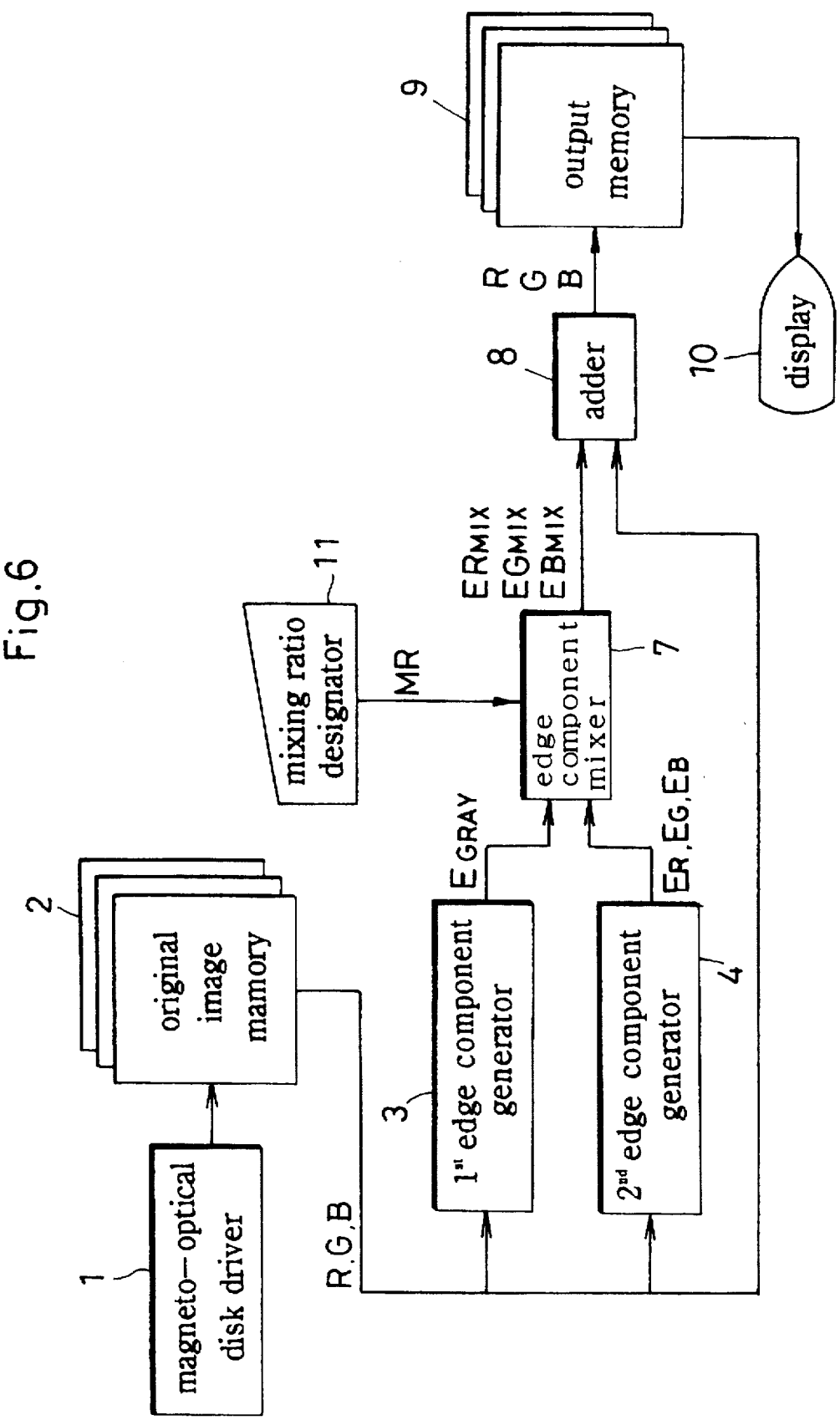
FIG. 6 is a block diagram showing an outline of a second embodiment.

An apparatus in the second embodiment will be described next with reference to FIG. 6.

The characteristic of this embodiment lies in a mixing ratio designator 11 provided in place of the saturation evaluator 5 and mixing ratio determiner 6 described in the first embodiment, for designating a fixed mixing ratio between the gray edge component generated by the first edge component generator 3 and RGB edge components generated by the second edge component generator 4. The other aspects of construction are the same as in the first embodiment, and will not be described again.

In a plate-making process or the like, the operator may desire to process an original image in a way to reflect his or her intended expression directly therein. Where, for example, the original image is a landscape containing numerous fresh green leaves, the operator may wish to emphasize the saturation of the entire original image to make the green leaves more vivid. Where the original image shows a mechanical structure based on an achromatic tone, the operator may wish to emphasize brightness of the entire original image to increase a mechanical feel.

In such a case, sharpness processing may be carried out more faithfully to the operator's intended expression if the operator himself or herself designates a mixing ratio between gray edge component and RGB edge components, rather than determining one based on an evaluation of saturation of each pixel in the original image as in the first embodiment.

In this embodiment, the operator inputs a fixed mixing ratio of edge components through the mixing ratio designator 11. Thus, the edge component mixer 7 generates mixed edge components for each pixel by mixing the gray edge component and RGB edge components based on the mixing ratio specified for all pixels in the original image. The mixing ratio may be specified in any convenient way, e.g.

using a numerical value 0 to 100. When the specified numerical value is "30", for example, the gray edge component in the mixed edge component is 30%, and the RGB edge components 70%. The mixing ratio may be inputted through a keyboard, or may be specified on the display 10 by means of a mouse or the like. The unsharp mask processing after designation of a mixing ratio is the same as in the first embodiment, and will not be described again.

Figure 7:
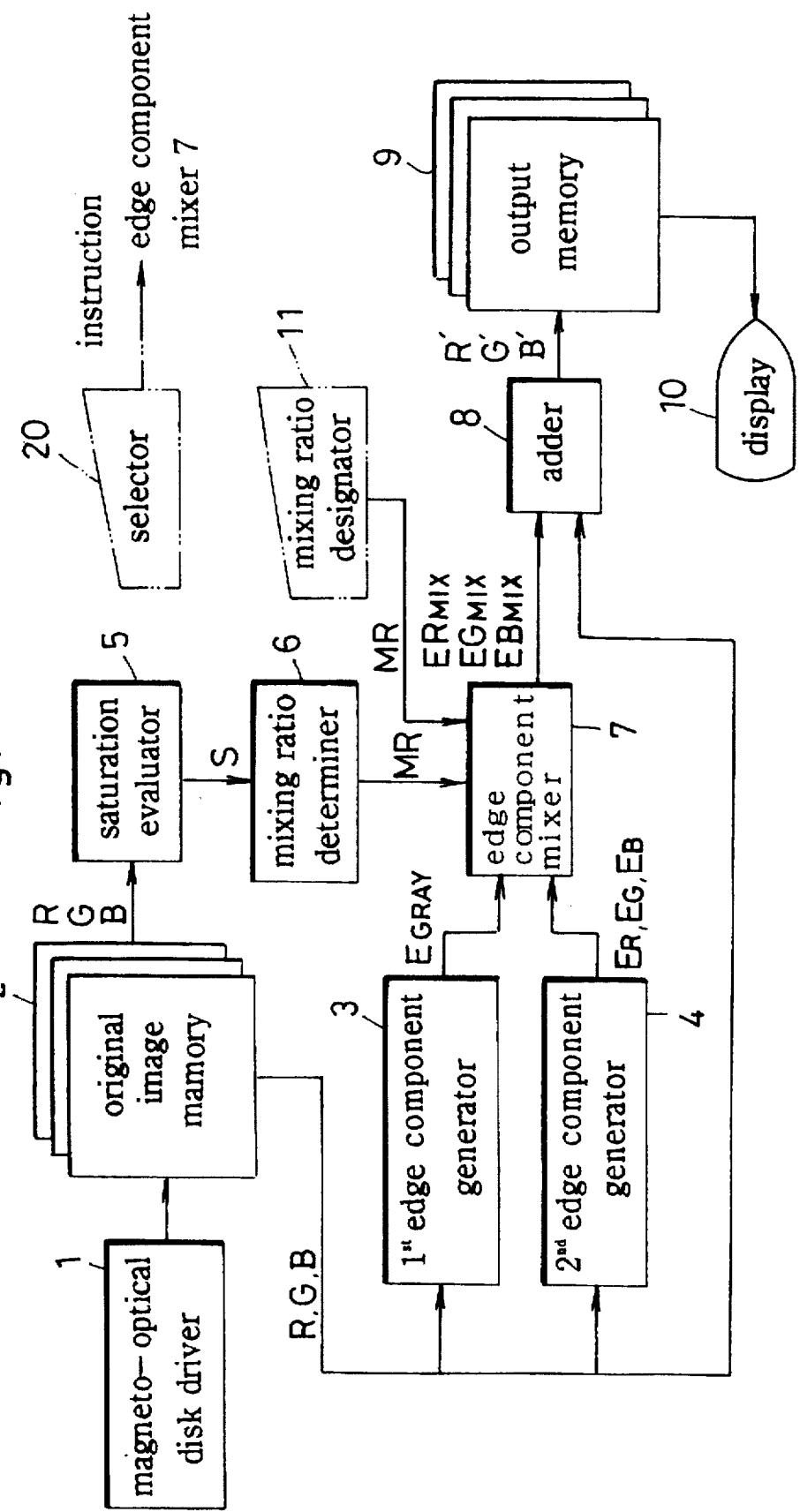
FIG. 7 is a block diagram showing an outline of a further embodiment.

It is in accordance with this invention to add the mixing ratio designator 11 described in the second embodiment to the apparatus in the first embodiment, as shown in FIG. 7. This construction allows a selection between an automatic determination of a mixing ratio between the edge components based on the saturation of each pixel in the original image, and a mixing ratio designation by the operator through the mixing ratio designator 11. When, for example, a mixing ratio is inputted through the mixing ratio designator 11, this mixing ratio may be adopted, overriding the automatic selection. Alternatively, a selector 20 may be provided to enable the operator to select one of the two modes. An instruction given through the selector 20 is transmitted to the edge component mixer 8, whereby the latter mixes the edge components in the mixing ratio selected. In this case, the saturation evaluator 5 and mixing ratio determiner 6 may be adapted operable only when a selection is made for the automatic determination of a mixing ratio between the edge components based on the saturation of each pixel in the original image.

The present invention may be embodied in other specific forms without departing from the spirit or essential attributes thereof and, accordingly, reference should be made to the appended claims, rather than to the foregoing specification, as indicating the scope of the invention.

What is claimed is:

1. An image sharpness processing method for controlling sharpness of a color-separated original image with unsharp masks, comprising:

a first edge component generating step for preparing a gray image of said original image by extracting a gray component from said original image, preparing a gray unsharp mask which is a blurred gray image from said gray image, and determining a difference between said gray image and said gray unsharp mask for each pixel, said difference being regarded as a gray edge component of each pixel;

a second edge component generating step for preparing color unsharp masks which are blurred images from respective color components of said original image, and determining a difference between an image composed of components of each color and a corresponding one of said color unsharp masks for each pixel, said difference being regarded as a color edge component of each pixel;

a mixing ratio acquiring step for acquiring a mixing ratio between said gray edge component obtained at said first edge component generating step and each color edge component obtained at said second edge component generating step;

an edge component mixing step for performing an operation, for each pixel and for each color component, to mix, in said mixing ratio acquired, said gray edge component generated at said first edge component generating step and each color edge component generated at said second edge component generating step; and an adding step for performing an operation, for each pixel and for each color component, to add each mixed color edge component obtained at said edge component mixing step to a corresponding one of said color components of said original image.

2. An image sharpness processing method as defined in claim 1, wherein said mixing ratio acquiring step is executed to evaluate saturation of each pixel in said original image successively and determine a mixing ratio of the edge components for each pixel based on the saturation, such that, for pixels having low saturation, the edge component generated at said first edge component generating step is mixed in a larger amount than each edge component generated at said second edge component generating step, and for pixels having high saturation, each edge component generated at said second edge component generating step is mixed in a larger amount than the edge component generated at said first edge component generating step.

3. An image sharpness processing method as defined in claim 1, wherein said mixing ratio acquiring step is executed to acquire a common fixed mixing ratio designated for all pixels.

4. An image sharpness processing method as defined in claim 1, wherein said gray image is prepared by performing an operation, for all pixels constituting said original image, to calculate an average of color components constituting each pixel in said original image.

5. An image sharpness processing method as defined in claim 1, wherein said gray unsharp mask is prepared by successively treating individual pixels in said gray image as a key pixel, and replacing image data of said key pixel with an average of image data of neighboring pixels in said gray image.

6. An image sharpness processing method as defined in claim 1, wherein each color unsharp mask of said original image is prepared by successively treating individual pixels in each color component image as a key pixel, and replacing image data of said key pixel with an average of image data of neighboring pixels in said each color component image.

7. An image sharpness processing method as defined in claim 1, wherein said adding step is executed by multiplying the mixed edge components by an appropriate coefficient when adding each mixed color edge component of each pixel to each color component of each pixel in said original image.

8. An image sharpness processing method as defined in claim 2, wherein the saturation of each pixel is determined by totaling absolute values of differences among the color components constituting each pixel.

9. An image sharpness processing method as defined in claim 2, wherein the mixing ratio is derived for each pixel from $MR=S/S_0$, where MR is a mixing ratio of each edge component determined at said second edge component generating step, $(1-MR)$ is a mixing ratio of the edge component determined at said first edge component generating step, S is the saturation of each pixel, and $S_0$ is a maximum saturation.

10. An image sharpness processing method as defined in claim 2, wherein the mixing ratio is derived for each pixel from $MR=(S/S_0)\times\alpha$, where MR is a mixing ratio of each edge component determined at said second edge component generating step, $(1-MR)$ is a mixing ratio of the edge component determined at said first edge component generating step, S is the saturation of each pixel, $S_0$ is a maximum saturation, and $\alpha$ is a predetermined coefficient.

11. An image sharpness processing apparatus for controlling sharpness of a color-separated original image with unsharp masks, comprising:

first edge component generating means for preparing a gray image of said original image by extracting gray components from said original image, preparing a gray unsharp mask which is a blurred gray image from said gray image, and determining a difference between said gray image and said gray unsharp mask for each pixel, said difference being regarded as a gray edge component of each pixel;

second edge component generating means for preparing color unsharp masks which are blurred images from respective color components of said original image, and determining a difference between an image composed of components of each color and a corresponding one of said color unsharp masks for each pixel, said difference being regarded as a color edge component of each pixel;

mixing ratio determining means for evaluating saturation of each pixel in said original image successively and determining a mixing ratio of the edge components for each pixel based on the saturation, such that, for pixels having low saturation, the edge component generated by said first edge component generating means is mixed in a larger amount than each edge component generated by said second edge component generating means, and for pixels having high saturation, each edge component generated by said second edge component generating means is mixed in a larger amount than the edge component generated by said first edge component generating means;

edge component mixing means for performing an operation, for each pixel and for each color component, to mix, in said mixing ratio determined by said mixing ratio determining means, said gray edge component generated by said first edge component generating means and each color edge component generated by said second edge component generating means; and adding means for performing an operation, for each pixel and for each color component, to add each mixed color edge component obtained by said edge component mixing means to a corresponding one of said color components of said original image.

12. An image sharpness processing apparatus for controlling sharpness of a color-separated original image with unsharp masks, comprising:

first edge component generating means for preparing a gray image of said original image by extracting gray components from said original image, preparing a gray unsharp mask which is a blurred gray image from said gray image, and determining a difference between said gray image and said gray unsharp mask for each pixel, said difference being regarded as a gray edge component of each pixel;

second edge component generating means for preparing color unsharp masks which are blurred images from respective color components of said original image, and determining a difference between an image composed of components of each color and a corresponding one of said color unsharp masks for each pixel, said difference being regarded as a color edge component of each pixel;

mixing ratio designating means for designating a common fixed mixing ratio between the edge component obtained by said first edge component generating means and each edge component obtained by said second edge component generating means;

edge component mixing means for performing an operation, for each pixel and for each color component, to mix, in said mixing ratio designated by said mixing ratio designating means, said gray edge component generated by said first edge component generating means and each color edge component generated by said second edge component generating means; and means for performing an operation, for each pixel and for each color component, to add each mixed color edge component obtained by said edge component mixing means to a corresponding one of said color components of said original image.

13. An image sharpness processing apparatus as defined in claim 11, further comprising mixing ratio designating means for designating a common fixed mixing ratio between the edge component obtained by said first edge component generating means and each edge component obtained by said second edge component generating means, wherein the edge component obtained by said first edge component generating means and each edge component obtained by said second edge component generating means are mixed in a selected one of the mixing ratio determined by said mixing ratio determining means and the mixing ratio designated by said mixing ratio designating means.

* * * * *